United States Patent
Harris

(10) Patent No.: US 9,657,767 B2
(45) Date of Patent: May 23, 2017

(54) HOSE CLAMP FASTENER LOCKING DEVICE

(71) Applicant: Tyrone Harris, Lincoln, NE (US)

(72) Inventor: Tyrone Harris, Lincoln, NE (US)

( * ) Notice: Subject to any disclaimer, the term of this patent is extended or adjusted under 35 U.S.C. 154(b) by 0 days.

(21) Appl. No.: 14/481,883

(22) Filed: Sep. 9, 2014

(65) Prior Publication Data

US 2015/0068016 A1 Mar. 12, 2015

Related U.S. Application Data

(60) Provisional application No. 61/875,319, filed on Sep. 9, 2013.

(51) Int. Cl.
| | | |
|---|---|---|
| *F16B 39/24* | (2006.01) | |
| *F16B 39/20* | (2006.01) | |
| *F16L 3/12* | (2006.01) | |
| *F16L 33/08* | (2006.01) | |
| *F16B 21/14* | (2006.01) | |

(52) U.S. Cl.
CPC ............ *F16B 39/20* (2013.01); *F16L 3/1211* (2013.01); *F16L 33/08* (2013.01); *F16B 2021/14* (2013.01); *Y10T 24/1443* (2015.01); *Y10T 29/49826* (2015.01)

(58) Field of Classification Search
CPC ...... F16B 39/20; F16B 39/24; F16B 2021/14; F16L 3/1211; F16L 33/08
USPC .......................................... 411/132–133, 250
See application file for complete search history.

(56) References Cited

U.S. PATENT DOCUMENTS

| | | | | |
|---|---|---|---|---|
| 334,070 A | * | 1/1886 | Castle | F16B 39/20 411/87 |
| 957,746 A | * | 5/1910 | Clawson | F16B 39/20 411/87 |
| 3,365,218 A | | 1/1968 | Denyes | |
| 3,389,442 A | | 6/1968 | Tetzlaff | |
| 3,602,284 A | * | 8/1971 | Smith | F16B 39/26 338/148 |
| 4,414,715 A | * | 11/1983 | Anjos | F16L 33/04 24/27 |
| 4,489,464 A | * | 12/1984 | Massari | F16L 33/03 24/20 LS |
| 4,497,090 A | * | 2/1985 | Proctor | F16L 33/10 24/20 R |
| 4,592,576 A | * | 6/1986 | Proctor | F16L 33/04 24/279 |
| 6,773,037 B2 | | 8/2004 | Spurgat | |
| 8,060,991 B2 | | 11/2011 | Ryhman | |
| 8,418,512 B2 | | 4/2013 | Trank | |
| 2012/0291232 A1 | | 11/2012 | Nakamura | |

* cited by examiner

*Primary Examiner* — Roberta Delisle
(74) *Attorney, Agent, or Firm* — Global Intellectual Property Agency, LLC; Daniel Boudwin

(57) ABSTRACT

A hose clamp fastener positive locking device is provided that comprises a two-legged, pronged device adapted to secure about the fastener housing of a hose clamp and prevent rotation of a slotted fastener disposed therein. The device comprises a first and second leg joined to an upstanding member. The upstanding member engages the slotted fastener head of the hose clamp, while the legs are positioned about the sides of the fastener housing. The distal ends of the legs are pinched together about the end of the fastener housing to secure the upstanding member and the legs to the fastener housing.

9 Claims, 3 Drawing Sheets

— 1 —

HOSE CLAMP FASTENER LOCKING DEVICE

CROSS REFERENCE TO RELATED APPLICATION

This application claims the benefit of U.S. Provisional Application No. 61/875,319 filed on Sep. 9, 2013. The above identified patent application is herein incorporated by reference in its entirety to provide continuity of disclosure.

BACKGROUND OF THE INVENTION

Field of the Invention

The present invention relates to hose clamp assemblies and positive locking devices that prevent threaded fasteners from working loose once they have been installed and torqued. More specifically, the present invention relates to a fastener-engaging assembly for a slotted hose clamp fastener that secures about the fastener housing and through the slot of the fastener supported therein.

Hose clamps are known devices in the art that are used to secure a relatively flexible hose to a junction by clamping the exterior surface of the hose at its end once the hose has been secured over the junction. The clamp is generally a circular band of material that is positioned about the outer circumference of the hose and tightened to reduce the open inner diameter within the band. Clamping pressure is applied to the hose end and to the junction, thereby securing the hose to the junction and preventing separation thereof when the hose is used to communicate fluid or pressurized. This type of connection is well known in the mechanical arts, and is used extensively in automotive, marine, and heat exchange applications.

A common type of hose clamp uses a threaded fastener to control the diameter of the clamp and thus the clamping pressure applied. This type of hose clamp is the screw and band style, in which a fastener is threadably engaged with a fastener housing and the band includes a threaded pattern. The captive fastener is rotated, which draws the band through the housing to reduce its free length and therefore the diameter of the band. The fastener therefore acts as a worm drive to control the band clamping pressure on the hose and the attached junction.

Problems with this type of hose clamp arise after extended use or in the event of manufacturing defects that create improper tolerances between the fastener and the fastener housing. Over time, the fastener can work its way loose or back out from the housing slightly, thereby causing the clamping pressure to reduce. This can result in minor leaks at the connection of the hose and the junction, or altogether separation thereof. For certain applications, this can be catastrophic.

Common means of securing fasteners include a class of tools known as positive locking devices, which are used together with a fastener to positively secure a fastener in place after installation. Many times harsh environments, vibration, or improper tolerances can result in the fastener becoming loose over time. Solutions include mechanical devices that lock the head of the fastener in place and prevent rotation. There are several known devices of this type in the art, including liquid thread adhesives that serve a similar function.

The present invention represents a positive locking device that is particularly suited for hose clamps using a captive fastener and a threaded band. Specifically, the present invention comprises a pronged clip that surrounds the fastener housing of a hose clamp, engages the slotted fastener thereof, and is pinched into place about the opposite end of the fastener housing. The device comprises a first and second leg that is adapted to be positioned along the sides of a fastener housing. The legs secure to an upstanding member that is adapted to be received through the slot of a slotted fastener captive in the fastener housing. The distal ends of the legs are then pinched together to secure the device at both ends and along the sides of the fastener housing of the hose clamp. The upstanding member resists rotation of the fastener while attached thereto, preventing any loosening of the clamp over time.

DESCRIPTION OF THE PRIOR ART

Devices have been disclosed in the prior art that relate to hose clamps and assemblies attachable thereto. These include devices that have been patented and published in patent application publications. These devices generally relate to devices adapted to preventing sliding of the clamp along the hose or devices for improving clamping pressure thereupon. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Pat. No. 6,773,037 to Spurgat, which discloses a bracket that is attachable over the fastener housing of a hose clamp to maintain the position of the fastener housing along the exterior surface of a hose end while tightening the same. The bracket secures over and under the housing and prevents the clamp from twisting and lateral movement of the clamp while securing the same. While the Spurgat device is one that secures to a fastener housing of a hose clamp to assist with installation, its structure is designed to prevent sliding of the hose clamp along the exterior of the hose. The present invention is related to the tension applied to the hose clamp and the fastener disposed within the fastener housing. Specifically, the present invention relates to a positive locking device that prevents the fastener from backing out once installed, thereby maintaining the original clamping pressure on the hose.

Another device indicative of the art is U.S. Pat. No. 3,389,442 to Tetzlaff, which discloses a hose clamp attachment member that distributes load about the hose clamp band and furthermore prevents sliding of the clamp along the length of the hose. The device includes a load distributing member that exerts the fastener pressure around the circumference of the hose, while an extended arm is disposed laterally from the hose clamp to engage the end of the hose. The arm prevents sliding of the hose clamp along the hose. The Tetzlaff device is related to load distribution and clamp sliding prevention. The present invention is related to the hose clamp fastener and preventing the same from backing out of the fastener housing when exposed to adverse environments, high vibration, and a long service life.

The devices of the art are largely related to attachments that prevent sliding of the hose clamp along the hose and to assemblies that assist installation thereof. The present invention is specifically design to prevent the captive fastener of a hose clamp from withdrawing from the fastener housing, in a similar manner as provided by safety wire and other positive locking devices.

The present invention is installed after the hose clamp is clamped into place and the hose clamp fastener is torqued.

The device is positioned about the sides and end of the fastener housing and engages the slot of the fastener to prevent unwanted rotation during operation. The present invention is then secured about the opposing end of the fastener housing and load from the fastener slot is transferred through the locking device legs and into the housing in the form of bearing load. The static arrangement of the locking device resists fastener rotation.

Overall, the present invention is substantially divergent in design elements from the prior art, and consequently it is clear that there is a need in the art for an improvement to existing hose clamp fastener positive locking devices. In this regard the instant invention substantially fulfills these needs.

SUMMARY OF THE INVENTION

In view of the foregoing disadvantages inherent in the known types of hose clamp attachments now present in the prior art, the present invention provides a new hose clamp fastener positive locking device that can be utilized for providing convenience for the user when securing the fastener of a hose clamp to prevent loosening of the hose clamp while in use.

It is therefore an object of the present invention to provide a new and improved hose clamp fastener positive locking device that has all of the advantages of the prior art and none of the disadvantages.

It is another object of the present invention to provide a hose clamp fastener positive locking device that engages a hose clamp having a fastener housing and a fastener tangentially mounted to a hose clamp band, whereby the device is adapted to engage the slotted fastener head of a fastener disposed within the housing.

Another object of the present invention is to provide a hose clamp fastener positive locking device that comprises a two legged, pronged device that secures about the sides of a fastener housing of a hose clamp, engages the slotted fastener thereon, and is locked into position by clamping together the distal ends of the legs together about the opposite end of the fastener housing.

Yet another object of the present invention is to provide a hose clamp fastener positive locking device that is secured on the hose clamp after the clamp has been installed, thereby not interfering with the installation process or requiring modification of an existing hose clamp to properly install.

Another object of the present invention is to provide a hose clamp fastener positive locking device that may be readily fabricated from sturdy yet flexible material, whereby the construction thereof permits relative economy that is designed to be commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
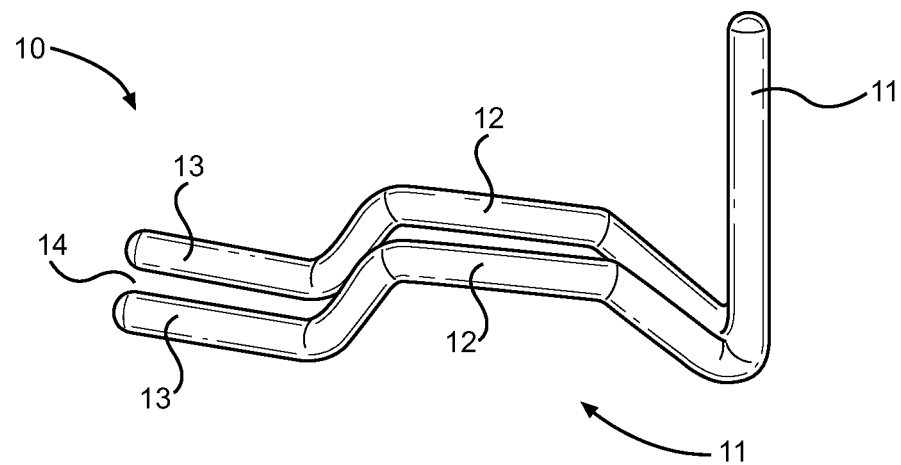
FIG. 1 shows a side perspective view of the hose clamp fastener locking device of the present invention.

Reference is made herein to the attached drawings. Like reference numerals are used throughout the drawings to depict like or similar elements of the hose clamp fastener locking device of the present invention. For the purposes of presenting a brief and clear description of the present invention, the preferred embodiment will be discussed as used for preventing unwanted rotation of a slotted fastener of a hose clamp after installation. The figures are intended for representative purposes only and should not be considered to be limiting in any respect.

Figure 2:
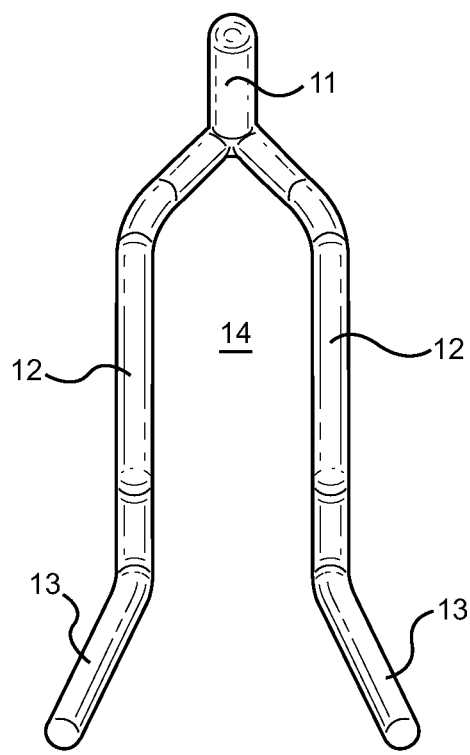
FIG. 2 shows an overhead view of the hose clamp fastener locking device of the present invention.

Referring now to FIGS. 1 and 2, there are shown views of the positive locking device of the present invention. The locking device is a positive locking device that is adapted to retain a slotted fastener within a fastener housing on a hose clamp and prevent rotation thereof once the fastener is torqued and the clamp is in a working state. The device is a pronged member having a pair of legs 12 separated by an interior space 14. The legs 12 secure to a common junction at a first end, and comprise separated, distal ends 13 at a second end 10.

Disposed at the common junction of the two legs 12 is an upstanding member 11. The upstanding member 11 comprises an elongated member that extends substantially vertically, while the legs 12 are disposed substantially perpendicularly thereto and within a common plane. The upstanding member 11 is adapted to be placed within the slot of a slotted fastener used to secure and tension a hose clamp. The slotted fastener is captive within the fastener housing, and the upstanding member 11 engages the slot when the slot is in a vertical state to prevent rotation after the fastener has been torqued and the hose clamp is applied to the hose.

The legs 12 of the present invention are adapted to secure to the sides of the fastener housing and act as two portions used to clamp the fastener housing within the interior space 14 therebetween. The device is preferably comprised of a metallic material, wherein the legs 12 sufficiently stiff and yet flexible enough to be clamped together against the outside surfaces of the fastener housing. Thick wire material is one embodiment of the present invention.

The distal ends 13 of the legs are adapted to extend beyond the opposite extent of the fastener housing once the upstanding member has engaged the slotted fastener thereof. The distal ends 13 are pinched together or otherwise pressed together, whereby the ends 13 form around the one end of the housing and the upstanding member is secured to the second end of the housing. The pinching action compresses the distal ends 13 together, causing the legs 12 to bear against the housing sides and prevent the device from shifting once applied. Any rotation of the fastener head is resisted by the upstanding member 11, which transmits any loading into the legs 12, which bear against the sides of the housing. The pinched distal ends 13 prevent the legs 12 from dislodging from the housing sides or popping off of the hose clamp assembly. The distal ends 13 of the device may be aligned with the longitudinal direction of the legs, or alternatively the distal ends 13 may flare outward from the legs 12 for improved purchase when pinching the same.

Figure 3:
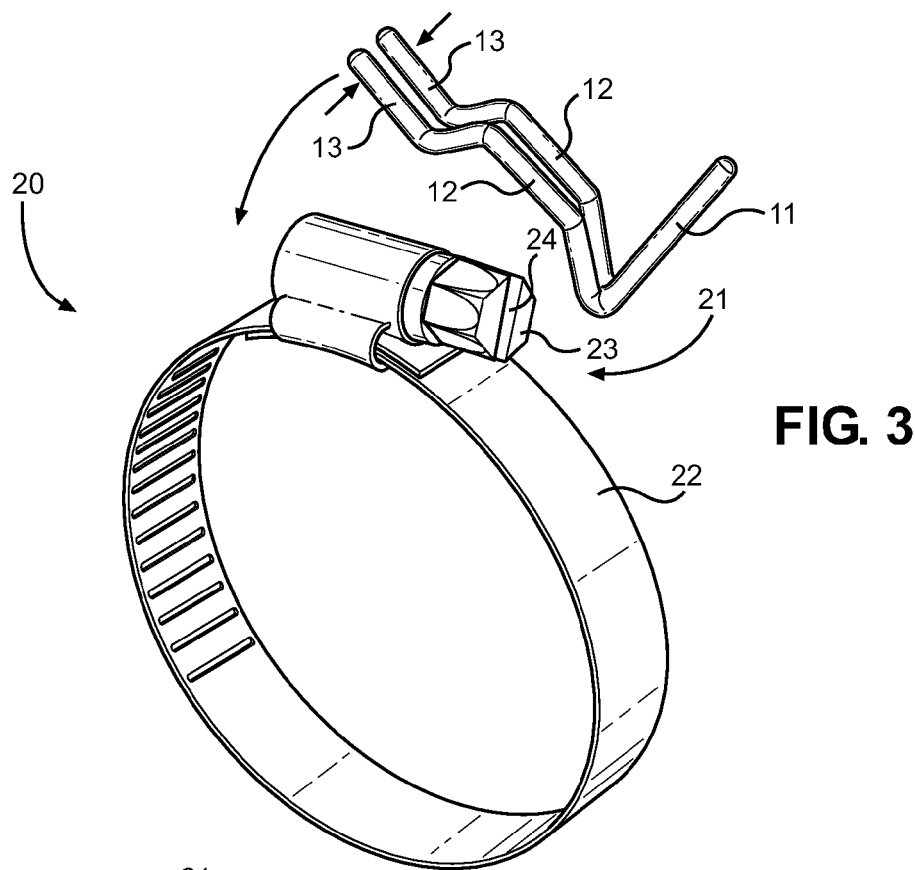
FIG. 3 shows a view of the device being installed on the fastener housing of a hose clamp.

Referring now to FIG. 3, an illustration of the positive locking device being applied to a fastener housing 21 is shown. Further shown is the structure of a typical hose clamp 20, wherein the hose clamp 20 comprises an elongated band 22, a fastener housing that tensions the band 22 and reduces its interior diameter, as well as a captive fastener 23 used to advance the band 22 through the housing 21. To prevent unwanted rotation of the fastener 23, the upstanding member 11 engages the slot 24 within the head of the fastener 23. The legs 12 of the device are spread apart and placed on opposing sides of the housing, whereafter the distal ends 13 thereof are pinched together about the opposite end of the housing.

Figure 4:
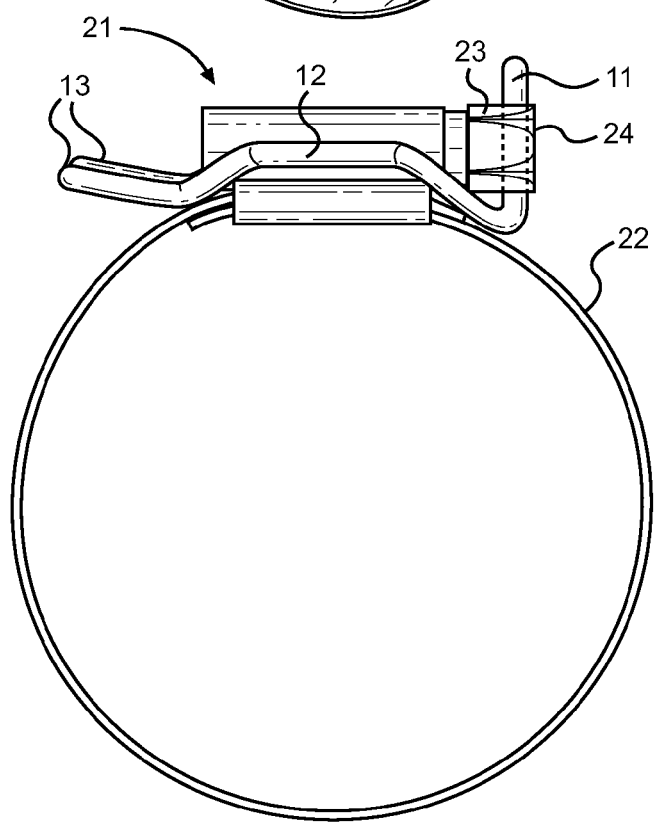
FIG. 4 shows a side view of the device in a working state, securing the fastener of a hose clamp and securing about the sides and end thereof.
Figure 5:
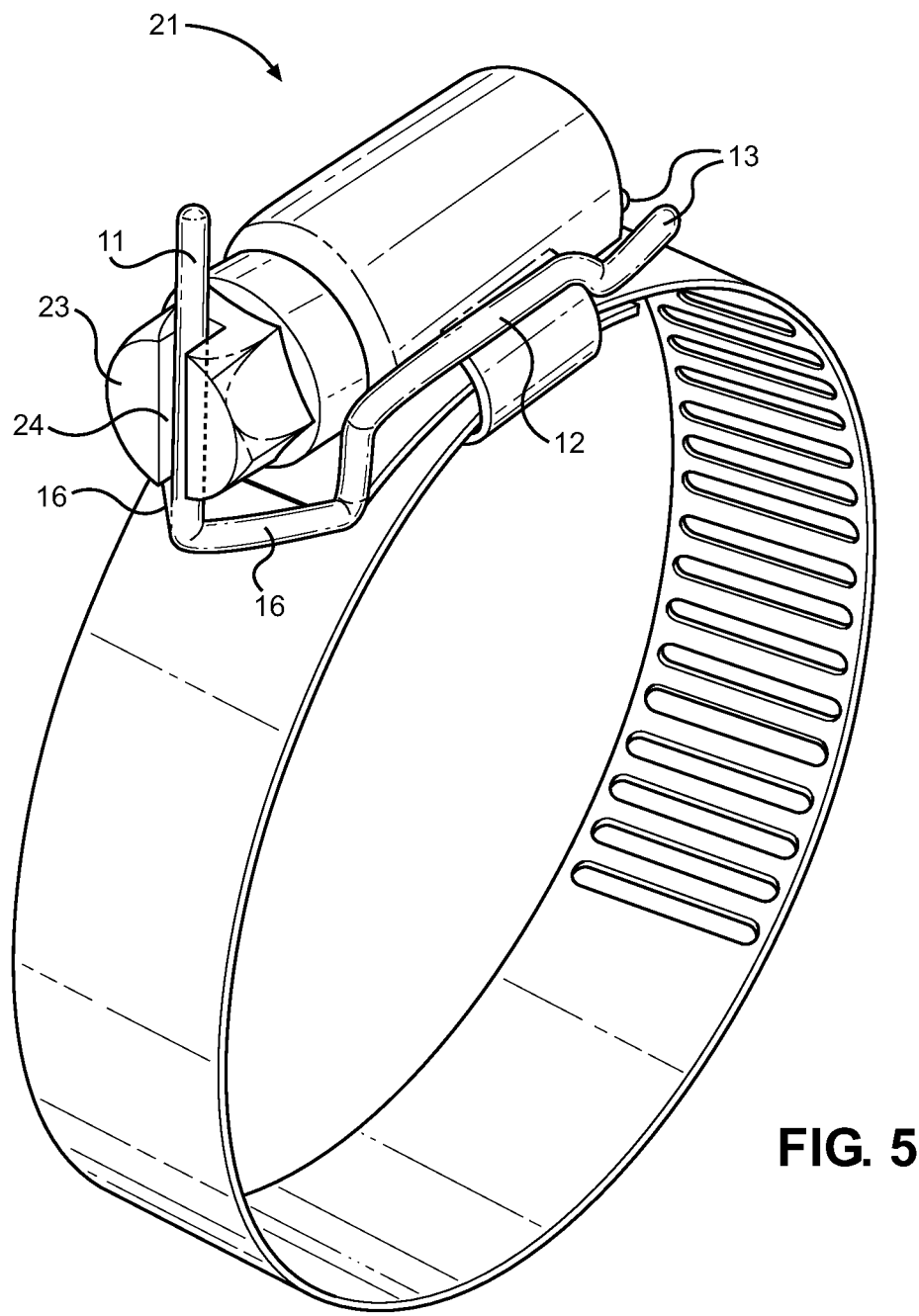
FIG. 5 shows another view of the device in a working state.

Referring to FIGS. 4 and 5, there are shown views of the present invention in an installed state on the fastener housing 21 and engaging the slotted fastener 23 of the hose clamp. The legs 12 of the device may be formed of linear sections of material, or alternatively segmented or curved sections. The latter are better adapted to form against the curved outer surface of the band 22 and the shape of the housing 21. This allows the upstanding member 11 to be positioned within the vertical slot 24 of the fastener 23 and remain statically disposed therein. The legs 12 form closely against the sides of the housing 21 while the distal ends 13 are pinched together along the end of the housing 21 opposite of the fastener 23. As shown in FIG. 5, the legs 12 may be joined to the upstanding member 11 at their junction using intermediate section 16, which are segments that place the legs 12 along the base of the housing and against the hose clamp band while the junction is disposed below the fastener head 23 such that the upstanding member 11 can engage the vertical slot 24 thereof.

Vibrations from vehicles and commercial equipment can cause hose clamps to loosen during use. Unfortunately, when this happens, vital fluids can leak from the hoses, causing damage to parts, which can be expensive to repair. Additionally, if the clamp on the fuel hose becomes loose, the leaking fuel can ignite a fire. The device of the present invention provides a convenient and simple way to secure a hose clamp in place, whereby the fastener thereof is prevented from unwanted movement. The device comprises a positive locking device that attaches to the fastener housing and engages the slotted fastener thereof. The locking capacity of the present invention prevents fluid leaks from an attached hose, reduces expensive and costly damage to vehicles and commercial equipment as a result thereof, and therefore serves as an inexpensive yet extremely useful hose clamp device for those in the art.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A positive locking device, comprising:
    a pronged member having a first leg and a second leg, said first leg and second leg being separated by an interior space therebetween;
    said first leg and second leg each having a first end connected to one another at a common junction;
    said first leg and second leg each having distal end separated from one another;
    an upstanding member extending substantially perpendicular to said first leg and said second leg;
    said upstanding member connected to said common junction and extending therefrom.

2. The positive locking device of claim 1, wherein:
    said interior space is configured to accommodate a fastener housing of a hose clamp; and,
    said first leg and said second leg comprise a length configured to extend along the sides of said fastener housing such that said distal ends extend from an opposite end thereof.

3. The positive locking device of claim 1, wherein said distal ends are flexible members that are readily pinched together during installation.

4. The positive locking device of claim 1, wherein:
    said first leg and said second leg comprise configured such that said first leg and said second leg can be disposed along a base of a fastener housing while said common junction is disposed below a fastener head extending from said fastener housing.

5. The positive locking device of claim 1, wherein said first leg and said second leg are segmented members.

6. The positive locking device of claim 1, wherein said first leg and said second leg are curved members.

7. The positive locking device of claim 1, wherein said distal ends flare outward from said first leg and said second leg.

8. The positive locking device of claim 1, wherein said upstanding member is configured to fit within a slot of a slotted fastener head.

9. A method of securing a slotted fastener of a hose clamp using a positive locking device, comprising the steps of:
    torqueing a slotted fastener of a hose clamp, said slotted fastener being disposed within a fastener housing;
    positioning the slot of the slotted fastener in a vertical state;
    securing said slotted fastener via an upstanding member of a positive locking device by positioning said upstanding member within said slot;
    stabilizing said upstanding member by positioning arms of said positive locking device about said fastener housing;
    pinching distal ends of said arms together along an end of said fastener housing opposite of said slotted fastener.

* * * * *